(12) United States Patent
Fricke et al.

(10) Patent No.: US 8,522,187 B2
(45) Date of Patent: Aug. 27, 2013

(54) METHOD AND DATA PROCESSING SYSTEM TO OPTIMIZE PERFORMANCE OF AN ELECTRIC CIRCUIT DESIGN, DATA PROCESSING PROGRAM AND COMPUTER PROGRAM PRODUCT

(75) Inventors: Niels Fricke, Harrenberg (DE); Bernd Kemmler, Tuebingen (DE); Juergen Koehl, Schoenbuch (DE); Karsten Muuss, Niederkassel (DE); Matthias Ringe, Bonn (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/311,651

(22) Filed: Dec. 6, 2011

(65) Prior Publication Data

US 2012/0144362 A1    Jun. 7, 2012

(30) Foreign Application Priority Data

Dec. 6, 2010 (EP) .................................... 10193791

(51) Int. Cl.
  *G06F 9/455* (2006.01)
  *G06F 17/50* (2006.01)

(52) U.S. Cl.
  USPC ............................ 716/132; 716/133; 716/134

(58) Field of Classification Search
  USPC ........................................................ 716/132
  See application file for complete search history.

(56) References Cited

U.S. PATENT DOCUMENTS

| | | | |
|---|---|---|---|
| 7,562,316 B2 | 7/2009 | Tschanz et al. | |
| 7,594,202 B2 | 9/2009 | Dood et al. | |
| 7,665,047 B2 | 2/2010 | Orshansky et al. | |
| 7,689,942 B2 | 3/2010 | Acar et al. | |
| 7,707,449 B2 | 4/2010 | Graef | |
| 7,716,618 B2 | 5/2010 | Ferrari et al. | |
| 7,739,626 B2 | 6/2010 | Jin et al. | |
| 7,743,297 B2 | 6/2010 | Uchida | |
| 2002/0152409 A1 | 10/2002 | Chu et al. | |
| 2010/0153897 A1* | 6/2010 | Zahn ................................ | 716/9 |

OTHER PUBLICATIONS

DeColle, et al., "Power and Design for Test: A Design Automation Perspective", Journal of Low Power Electronics, vol. 1, Apr. 2005, p. 73-84 (12).

* cited by examiner

*Primary Examiner* — Paul Dinh
*Assistant Examiner* — Bryce Aisaka
(74) *Attorney, Agent, or Firm* — Kevin B. Anderson; Richard Kotulak

(57) ABSTRACT

A method to optimize performance of an electric circuit design is disclosed. The method comprises providing for each circuit element of the electric circuit design available design parameter options; transforming the electric circuit design and the design parameter options into a linear programming model; determining a solution for the linear programming model; and based on the solution generating a list of circuit elements which design parameters need to be changed to a different option to achieve performance optimization.

14 Claims, 3 Drawing Sheets

METHOD AND DATA PROCESSING SYSTEM TO OPTIMIZE PERFORMANCE OF AN ELECTRIC CIRCUIT DESIGN, DATA PROCESSING PROGRAM AND COMPUTER PROGRAM PRODUCT

BACKGROUND

The present invention relates in general to the field of semiconductor design tools, and in particular to a method to optimize performance of an electric circuit design, and a data processing system to optimize performance of an electric circuit design. Still more particularly, the present invention relates to a data processing program and a computer program product for performing a method to optimize performance of an electric circuit design.

A digital integrated circuit is typically built by combining prefabricated elements called "cells". The cells perform Boolean combinatorial functions or storage. Different cells may perform the same function but use different amounts of power. Typically, the cell with lower power consumption is slower, i.e. takes longer to perform its function. An example for different cells with equal digital function is the usage of different threshold voltage ($V_T$) levels. Here the cells differ just by the thickness of the oxide; all other physical design characteristics are equal. As low power consuming cells are slower it is in many cases impossible to exclusively use these types. Moreover, it is prohibitive to enumerate all candidates since the number of cases to be analyzed grows exponentially with the number of instances of cells.

A simple and known technique arbitrarily picks an instance of a cell, swaps the cell with a lower power consuming one and analyzes the timing impact. If no new timing violations come into existence the swap will be made permanent otherwise it will be revoked.

An enhancement of the technique above is to order the instances by the possible power reduction in a descending way and apply the technique above.

In the Patent Application Publication U.S. 2002/0152409 A1 "METHOD OF POWER CONSUMPTION REDUCTION IN CLOCKED CIRCUITS" by Chu et al. method and apparatus for reducing power consumption of a clocked circuit containing a plurality of latches is disclosed. A first latch, within the plurality of latches, is located which has more than a predetermined slack. The possibility of substituting an available second latch requiring less power to operate is then determined, subject to the constraint that the slack after substitution should still be positive, although it may be less than the predetermined number mentioned above. Where such a possibility is determined to exist, the first latch is then replaced with the available second latch.

In U.S. Pat. No. 7,594,202 B2 "OPTIMIZATION OF CIRCUIT DESIGNS USING A CONTINUOUS SPECTRUM OF LIBRARY CELLS" by de Dood et al. method of optimizing a circuit design having a plurality of library cells is disclosed. In one embodiment, the method includes the steps of providing a plurality of logically equivalent cells that vary in at least one design parameter, the plurality of logically equivalent cells having a relatively continuous spectrum of values of one of the design parameters, evaluating a selected characteristic of the circuit design; and replacing a cell in the circuit design with a cell an equivalent cell.

SUMMARY

An aspect of the present invention is to provide a method to optimize performance of an electric circuit design and a data processing system to optimize performance of an electric circuit design, which are able to efficiently analyze all cells or instances of the electric circuit design and output a result indicating which cells or instances can be changed to optimize the performance of the electric circuit design.

According to the present invention, a method to optimize performance of an electric circuit design having the features of claim 1, a data processing system to optimize performance of an electric circuit design having the features of claim 7, a data processing program having the features of claim 14, and a computer program product having the features of claim 15 are provided. Advantageous embodiments of the present invention are mentioned in the dependent claims.

According to an embodiment of the present invention, a method to optimize performance of an electric circuit design, comprises providing for each circuit element of the electric circuit design available design parameter options; transforming the electric circuit design and the design parameter options into a linear programming model; determining a solution for the linear programming model; and based on the solution generating a list of circuit elements which design parameters need to be changed to a different option to achieve performance optimization.

Further embodiments of the present invention, comprise changing power consumption parameters to achieve a reduction of power consumption of a corresponding circuit element and the electric circuit design as performance optimization.

Further embodiments of the present invention, comprise changing timing parameters to achieve speed up of function execution of a corresponding circuit element and the electric circuit design as performance optimization.

Further embodiments of the present invention, comprise using at least one of power level families and timing properties as available design parameter options to define circuit elements performing identical functions but comprising different power consumption and timing characteristics.

Further embodiments of the present invention, comprise using different threshold voltages to define the power level families, and using corresponding slacks to define the timing properties.

Further embodiments of the present invention, comprise using splitting storage elements of the electric circuit design into a start point piece and an end point piece during circuit transformation.

Further embodiments of the present invention, comprise determining and outputting at least one of timing and power recovery data table, a connectivity table, and an identical circuit elements table to be inputted in said linear optimization program.

In further embodiments of the present invention, the timing and power recovery data table comprise for each circuit element a slack value of an output pin, a slack delta value reducing the slack value if the considered circuit element is being recovered, and a power consumption reduction value.

In another embodiment of the present invention, a data processing system to optimize performance of an electric circuit design, comprises means for providing for each circuit element of the electric circuit design available design parameter options; means for transforming the electric circuit design and the design parameter options into a linear programming model; means for determining a solution for the linear programming model; and means for generating a list of circuit elements which design parameters need to be changed to a different option based on the solution to achieve performance optimization.

In further embodiments of the present invention, power consumption parameters are changed to achieve a reduction of power consumption of a corresponding circuit element and the electric circuit design as performance optimization.

In further embodiments of the present invention, timing parameters are changed to achieve a speed up of a corresponding function execution of a corresponding circuit element and the electric circuit design as performance optimization.

In further embodiments of the present invention, the available design parameter options comprise at least one of power level families and timing properties to define circuit elements performing identical functions but comprising different power consumption and timing characteristics, wherein different threshold voltages and corresponding slacks are used to define the power level families and the timing properties.

In further embodiments of the present invention, transforming means are determining and outputting at least one of timing and power recovery data table, a connectivity table, and an identical circuit elements table to the linear optimization program.

In another embodiment of the present invention, a data processing program for execution in a data processing system comprises software code portions for performing a method to optimize performance of an electric circuit design when the program is run on the data processing system.

In yet another embodiment of the present invention, a computer program product stored on a computer-usable medium, comprises computer-readable program means for causing a computer to perform a method to optimize performance of an electric circuit design when the program is run on the computer.

All in all, embodiments of the present invention employ a method and data processing unit to optimize performance of an electric circuit design based on linear programming for efficiently analyzing all cells and turning them into low power consuming cells, if possible.

Embodiments of the present invention are reducing power consumption by swapping cells with slower but less power consuming circuits, and providing for each circuit element, e.g. register, Boolean function block, etc., its slack and its available threshold voltage type options, for example. The electric circuit design, the slack values and the threshold voltage type options are transferred into a linear programming model; and a solution for the linear programming model is determined. From the solution a list of circuit elements is generated which need to be changed to a different power level.

Embodiments of the present invention analyze the cells in the circuit and turn them into low power consuming cells, by making use of the available slack, and generate a list of circuit elements (cells) that need to be changed using linear programming method.

The core idea of the present invention is to replace a cell or an instance of an electric circuit design by other cells or instances with lower power consumption or better performance characteristic based on a linear programming model. The resulting linear optimization program is solved by an industry standard solver like CPLEX, for example.

Transistors can be manufactured with different threshold voltages ($V_T$). Transistors with different threshold voltage have identical layout properties but different oxide thickness. High threshold voltage transistors have higher on-resistances than low threshold ones and cells using this type are therefore slower. High threshold voltage transistors in turn have lower leakage current and therefore lower power consumption.

Embodiments of the present invention are specifically aimed at threshold voltage recovery but can be applied to other power recovery techniques as well, e.g. low-power latch recovery.

Storage elements like registers and latches can be built in different design styles. Power optimized, also known as "low power", and speed optimized. The layout properties are very similar but typically not identical. Again, the faster type of registers takes more power.

The above, as well as additional purposes, features, and advantages of the present invention will become apparent in the following detailed written description.

DETAILED DESCRIPTION

Figure 1:
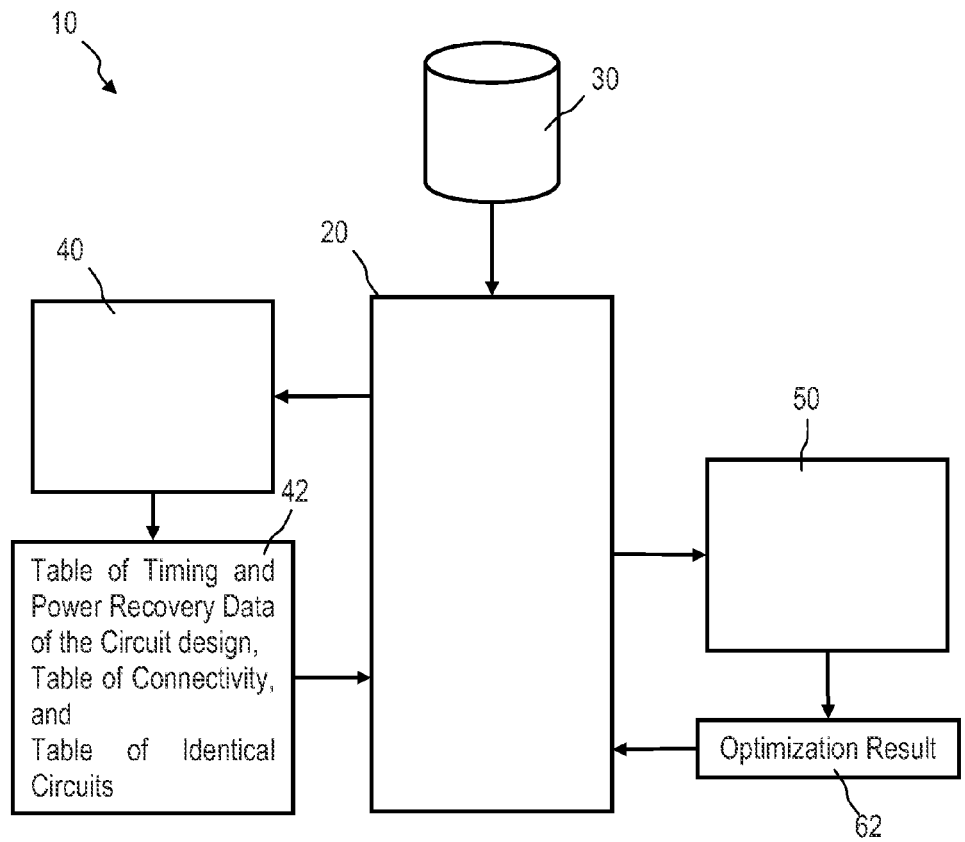
FIG. 1 is a schematic block diagram of a data processing system, in accordance with an embodiment of the present invention.
Figure 4:
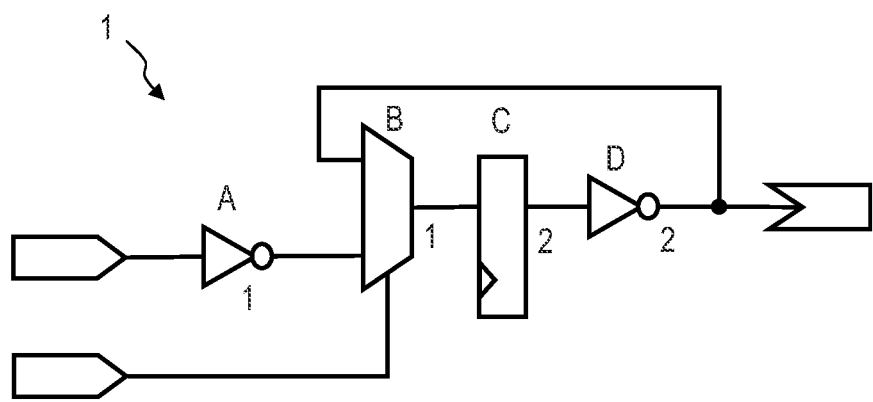
FIG. 4 is a schematic block diagram of an electric circuit design to be optimized.

FIG. 1 shows a data processing system 10 in accordance with an embodiment of the present invention; FIG. 4 shows an electric circuit design 1 to be optimized; and FIG. 5 shows a transferred electric circuit design 1' to be optimized based on the electric circuit design of FIG. 4.

Referring to FIG. 1, a data processing system 10 to optimize performance of an electric circuit design 1, 1' at gate or net list level, for example. In the shown embodiment the data processing system 10 comprises a data processing unit 20, a storage device 30 for electric circuit design data, a delay and timing calculator 40 and a linear optimization program 50.

Figure 5:
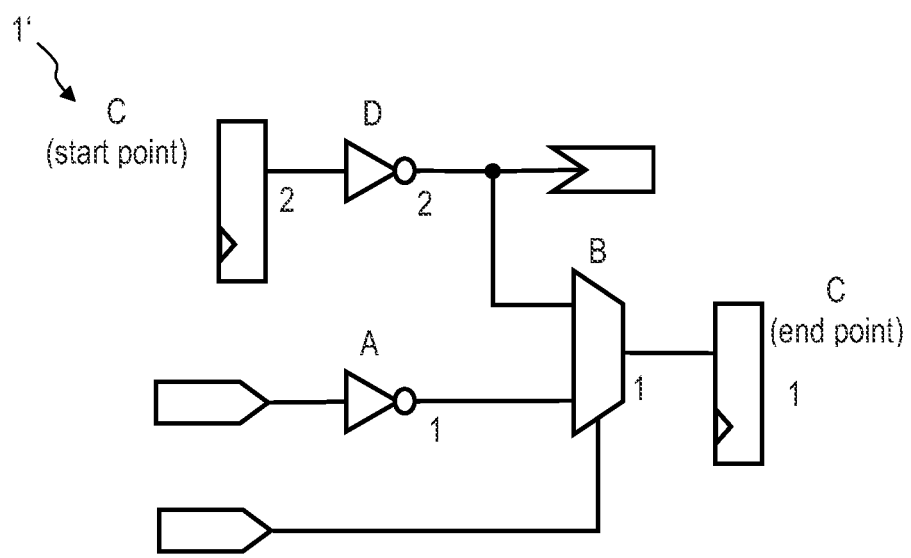
FIG. 5 is a schematic block diagram of a transferred electric circuit design to be optimized based on the electric circuit design of FIG. 4.

Referring to FIGS. 4 and 5, the exemplary electric circuit design 1, 1' will be used to show the generation of input data to the linear optimization program 50. The instance names of the electric circuit design 1, 1' are "A" through "D"; the numbers indicate the slack at an output pin of the circuit elements A, B, C, D. This electric circuit design 1, 1' contains one storage element C.

The storage device 30 provides for each circuit element A, B, C, D of the electric circuit design 1, 1' available design parameter options. The data processing unit 20 and the delay and timing calculator 40 are used for transforming the electric circuit design 1, and design parameter options of the circuits A, B, C, D into a linear programming model, wherein the linear optimization program 50 is used for determining a solution 62 for the linear programming model. Based on the solution 62 the data processing unit 20 generates a list of circuit elements A, B, C, D which design parameters need to be changed to a different option to achieve performance optimization of the electric circuit design 1, 1'.

During the transformation of the electric circuit design 1 of FIG. 4 to the electric circuit design 1' of FIG. 5, storage elements, here storage element C, are split into a start point and an end point. Storage elements typically act as both start and end points since they launch and capture events. In the shown embodiment the storage element C is virtually being split into two pieces. The start point piece of the storage element C has the original slack value of 2, and the output slack of the end point piece of the storage element C is identical to the predecessor circuit and has the slack value 1, as shown in FIG. 5.

The linear optimization program 50 can change power consumption parameters to achieve a reduction of power consumption of a corresponding circuit element A, B, C, D and the electric circuit design 1 as performance optimization and/or timing parameters to achieve a speed up of a corresponding function execution of a corresponding circuit element A, B, C, D and the electric circuit design 1 as performance optimization.

The available design parameter options, which are transformed into a linear programming model, comprise at least one of power level families and timing properties to define circuit elements A, B, C, D performing identical functions but comprising different power consumption and timing characteristics. For example, different threshold voltages ($V_T$) and corresponding slacks are used to define the power level families and the timing properties. The delay and timing calculator 40 is determining and outputting at least one of timing and power recovery data table, a connectivity table, and an identical circuit elements table as calculation result 42 to the data processing unit 20 transferring the tables as input data to the linear optimization program 50 for further processing.

In the following the principle of cells or circuit elements performing identical functions with different operation properties is explained. Let u be an instance of a cell C_a. These instances are referred to as circuits. C_a may be replaced by other cells C_b, C_c and so forth. These cells C_x have the identical functions and identical or very similar layout properties but C_a may be faster than C_b and C_b be faster than C_c. C_a uses more power than C_b and C_b more than C_c. a, b, c, . . . are referred to as power levels or families in general. Threshold voltage levels are a specific application. For simpler notation it is possible to focus on changing from one particular power level to another one. Although, the term "threshold voltage" is used in this description of the linear programming, it is to point out that the scope of the present invention is neither limited to one level nor just threshold voltage optimization.

In the shown embodiment the input to the linear optimization program 50 is the network of circuits $u_i$ to be optimized, slack and the available threshold voltage type options for each circuit and the change in slack and in power consumption for each of these options. As registers typically are listed as start and end circuits of a path, the optimization needs to consider these circuits as identical. There a list of identical circuits is also provided as input.

As decision variable for the linear optimization program 50 an integer 0/1 (0=no change) variable vt[u] is defined for each circuit u and each threshold voltage level vt. As further decision variable for each circuit u a counter SlackAdder[u] of the slack adder accumulated in the fan in cone of the circuit is defined.

The optimization function of the linear program is:

```
minimize sum(u in circuits) vt[u]+PowerDeltaArray[u];
The choice of the decision variables is limited by the constraints:
Only one threshold voltage type per circuit can be applied:
forall (u in Circuits) (sum (vt in VT type) vt[u] <= 1;
The slack adder is propagated through the network:
forall (source -> sink)
SlackAdder[sink] <= SlackAdder[source] +
vt[source]*SlackDeltaArray[vt,source] +
SlackBM[source/sink];
Here
```

```
SlackBM[source/sink] = max(0, Slack[source] - Slack[sink]);
measures the increase in slack from less critical to more critical paths.
This part mimics the calculation of slacks typically performed by
a static timing analyzer.
The slack adder must not exceed the allowed bounds:
forall (u in Circuits: Slack[u] > MinSlack)
SlackAdder[u] + vt[u]*SlackDeltaArray[u,vt] + Slack[u]
>= MinSlack;
forall (u in Circuits: Slack[u] <= MinSlack)
SlackAdder[u] + vt[u]*SlackDeltaArray[u,vt] >= 0;
Here MinSlack is a typically small positive lower bound for the slack.
Identical circuits are optimized to the identical threshold voltage
level.
forall(i, j in Identicals) vt[i] == vt[j];
```

Obviously the optimization functions as well as the constraints are linear functions. The resulting linear optimization program is solved by an industry standard solver, like CPLEX, for example.

Figure 2:
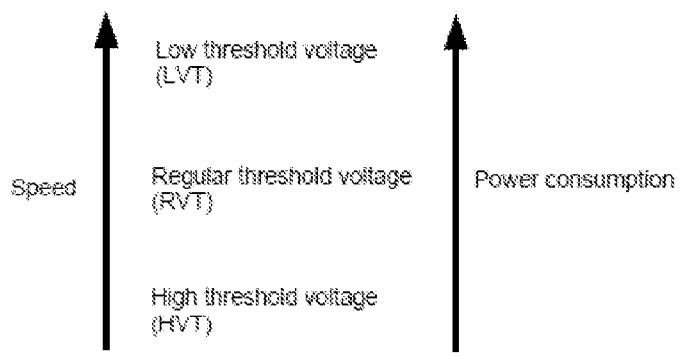
FIG. 2 is a schematic relation diagram of three typical threshold voltage families in view of speed and power consumption.

Transistors can be manufactured with different threshold voltages ($V_T$). Transistors with different threshold voltage have identical layout properties but different oxide thickness. High threshold voltage transistors have higher on-resistances than low threshold ones and cells using this type are therefore slower. High threshold voltage transistors in turn have lower leakage current and therefore lower power consumption. FIG. 2 shows three typical threshold voltage families LVT, RVT and HVT and corresponding relations in view of speed and power consumption, described above.

Storage elements like registers and latches can be built in different design styles: Power optimized, also known as "low power", and speed optimized. The layout properties are very similar but typically not identical. Again, the faster type of registers takes more power.

Figure 3:
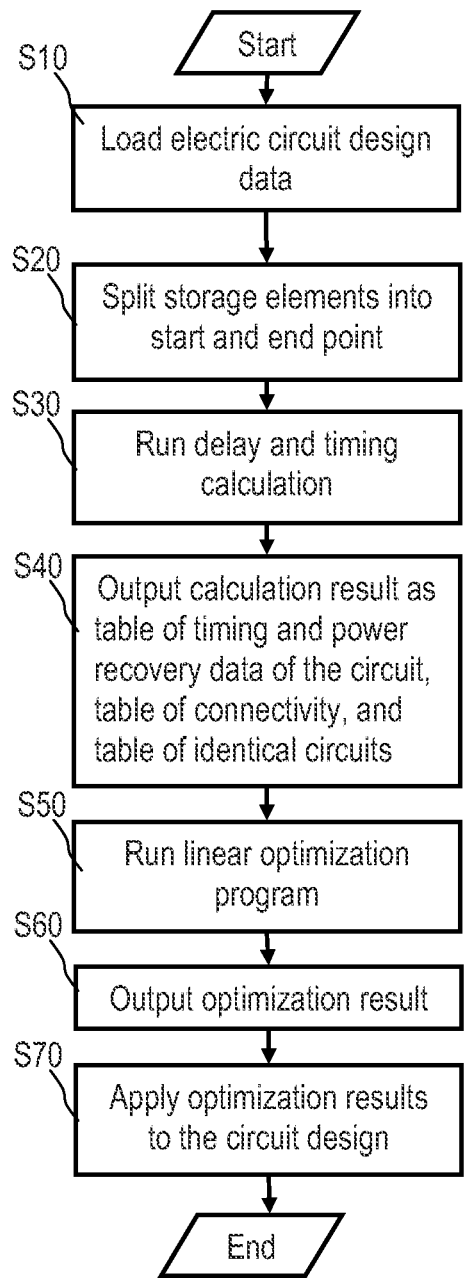
FIG. 3 is a schematic flow diagram of a method to optimize performance of an electric circuit design, in accordance with an embodiment of the present invention.

Referring to FIGS. 3 to 5, a method to optimize performance of an electric circuit design 1, 1' at a register transfer level is described in the following.

Referring to FIG. 3, in step S10 the electronic circuit design data are loaded from the storage device 30. In step S20 the storage element C is virtually split into two pieces. The start point piece of the storage element C has the original slack value of 2, and the output slack of the end point piece of the storage element C is identical to the predecessor circuit and has the slack value 1, as shown in FIG. 5. In step S30 a delay and timing calculation is run to generate Tables 1 to 3 of the calculation result, which is outputted at step S40.

Table 1 shows timing and power recovery data and contains one entry for each instance A, B, C, C after storage elements, here storage element C, have been split.

TABLE 1

| Unique Identifier | Instance | modifiable | slack | Δslack | Power reduction |
|---|---|---|---|---|---|
| 1 | "A" | 1 | 1.0 | 0.100 | 1.234 |
| 2 | "B" | 0 | 1.0 | 0.110 | 1.345 |
| 3 | "C" | 1 | 1.0 | 0.120 | 1.456 |
| 4 | "C" | 1 | 2.0 | 0.130 | 1.456 |
| 5 | "D" | 1 | 2.0 | 0.100 | 1.234 |

Referring to Table 1 each entry is composed of a unique identifier (integer variable), instance name (string variable), a Boolean flag indicating whether the instance is modifiable (Boolean variable), a slack at the output pin (float variable), slack delta which reduces the slack if the considered instance is being recovered (float variable), and a reduction of power consumption (float variable).

Table 2 describes connectivity of electric circuit design 1, and shows the translation to the electric circuit design 1' above. Note, that identifiers 3 and 4 describe instance "C" as end and start point, respectively.

TABLE 2

| Identifier | Predecessor | Successor |
|---|---|---|
| 1 | 1 | 2 |
| 2 | 2 | 3 |
| 3 | 4 | 5 |
| 4 | 5 | 2 |

In Table 2 each entry describes a pair of one predecessor and one successor instance. The entries are composed of a unique identifier (integer variable), a predecessor instance (integer variable), using the identifiers as defined in Table 1, and a successor instance (integer variable), using the identifiers as defined in Table 1.

Since the start and end point of storage elements cannot be changed independently, these need to be declared identical. This is being done through Table 3.

TABLE 3

| Identifier | Id1 | Id2 |
|---|---|---|
| 1 | 3 | 4 |

In Table 3 each entry is composed of unique identifier (integer variable), an end point instance identifier Id1 (integer variable), as defined in Table 1, and a start point instance identifier Id2 (integer variable), as defined in Table 1.

In step S50 the linear optimization program 50 is run based on the calculation result 43. The linear optimization program 50 outputs the optimization result 62 in step S60, which is applied to the circuit design. The result of applying the linear optimization program 50 is a plain list of instances to be changed to the different power level. Each entry contains the instance name. In the shown example the list contains circuit elements A, C, D.

Embodiments of the present invention are reducing power consumption of an electronic circuit during design by analyzing the cells in the circuit and turning them into low power consuming cells, making use of the available slack, and generating a list of circuit elements (cells) that need to be changed using linear programming method.

The inventive method to optimize performance of an electric circuit design can be implemented as an entire software embodiment, or an embodiment containing both hardware and software elements. An embodiment of the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method to optimize performance of an electric circuit design, comprising:
   providing for each circuit element of said electric circuit design available design parameter options;
   transforming said electric circuit design and said design parameter options into a linear programming model, wherein any storage elements of said electric circuit design are split into a start point piece and an end point piece;
   determining a solution for said linear programming model by using a computer; and
   based on said solution generating a list of circuit elements which design parameters need to be changed to a different option to achieve performance optimization.

2. The method according to claim 1, comprising changing power consumption parameters to achieve a reduction of power consumption of a corresponding circuit element and said electric circuit design as performance optimization.

3. The method according to claim 1, comprising changing timing parameters to achieve speed up function execution of a corresponding circuit element and said electric circuit design as performance optimization.

4. The method according to claim 2, comprising using at least one of power level families and timing properties as available design parameter options to define circuit elements performing identical functions but comprising different power consumption and timing characteristics.

5. The method according to claim 4, comprising using different threshold voltages ($V_t$) to define said power level families, and using corresponding slacks to define said timing properties.

6. The method according to claim 1, comprising determining and outputting at least one of a timing and power recovery data table, a connectivity table, and a identical circuit elements table to be inputted in said linear programming model.

7. The method according to claim 6, wherein said timing and power recovery data table comprises for each circuit element a slack value of an output pin, a slack delta value reducing said slack value when said considered circuit element is being recovered, and a power consumption reduction value.

8. A data processing program for execution in a data processing system comprising software code portions for performing an optimizing method according to claim 1 when said program is run on said data processing system.

9. A computer program product stored on a computer readable storage device, comprising computer-readable program means for causing a computer to perform an optimizing method according to claim 1 when said program is run on said computer.

10. A data processing system to optimize performance of an electric circuit design, comprising:
    means for providing for each circuit element of said electric circuit design available design parameter options;
    means for transforming said electric circuit design and said design parameter options into a linear programming model, wherein the means for transforming said electric circuit design and said design parameter options into a linear programming model splits any storage elements of said electric circuit design into a start point piece and an end point piece;
    means for determining a solution for said linear programming model; and
    means for generating a list of circuit elements which design parameters need to be changed to a different option based on said solution to achieve performance optimization.

11. The data processing system according to claim 10, wherein power consumption parameters are changed to achieve a reduction of power consumption of a corresponding circuit element and said electric circuit design as performance optimization.

12. The data processing system according to claim 11, wherein timing parameters are changed to achieve a speed up of a corresponding function execution of a corresponding circuit element and said electric circuit design as performance optimization.

13. The data processing system according to claim 11, wherein said available design parameter options comprise at least one of power level families and timing properties to define circuit elements performing identical functions but comprising different power consumption and timing characteristics, and wherein different threshold voltages (VT) and corresponding slacks are used to define said power level families and said timing properties.

14. The data processing system according to claim 10, wherein said transforming means is determining and outputting at least one of timing and power recovery data table, a connectivity table, and an identical circuit elements table to said linear programming model.

* * * * *